Figure 1:
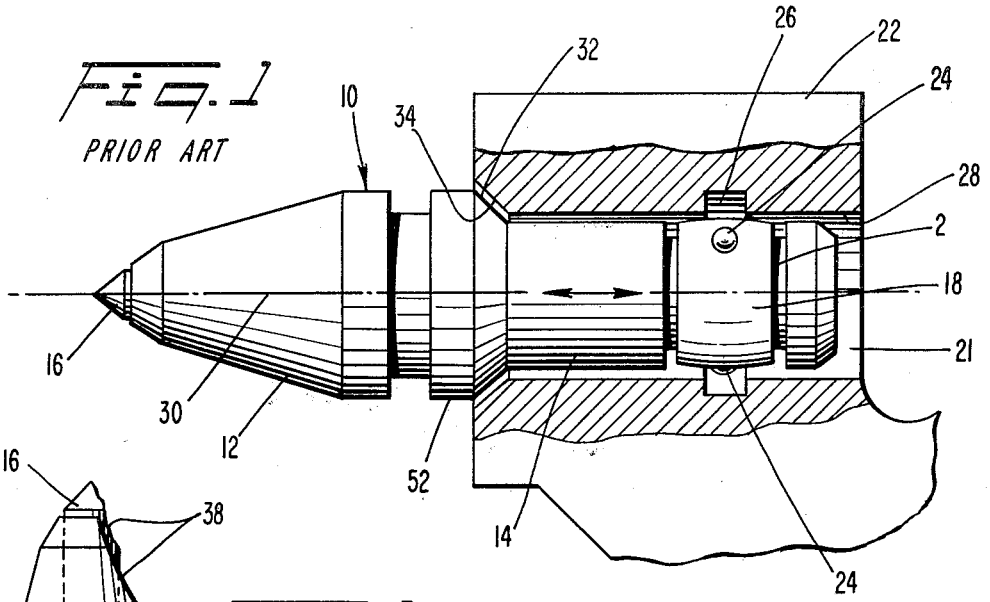
Fig. 1 PRIOR ART
Figure 2:
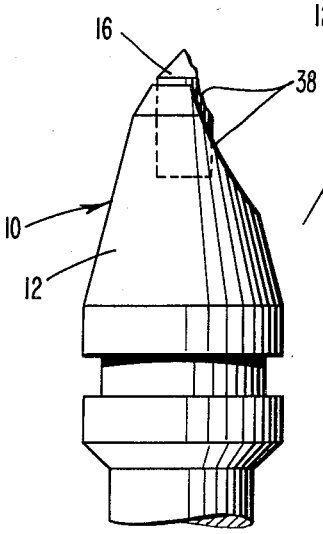
Fig. 2 PRIOR ART
Figure 3:
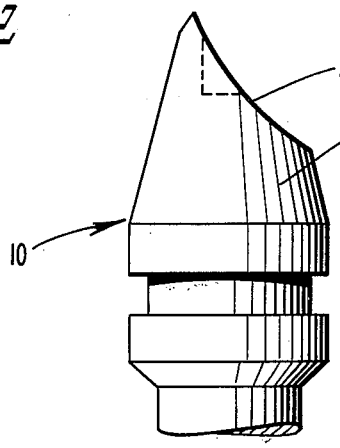
Fig. 3 PRIOR ART
Figure 4:
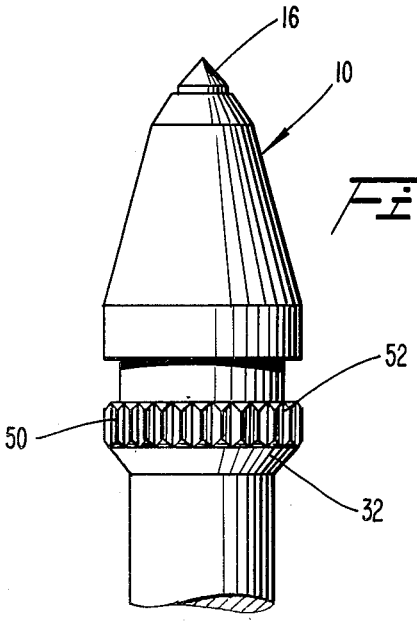
Figure 5:
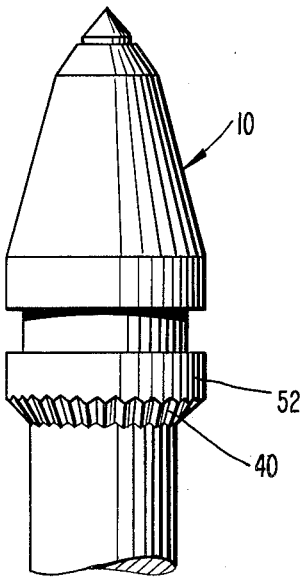
Figure 6:
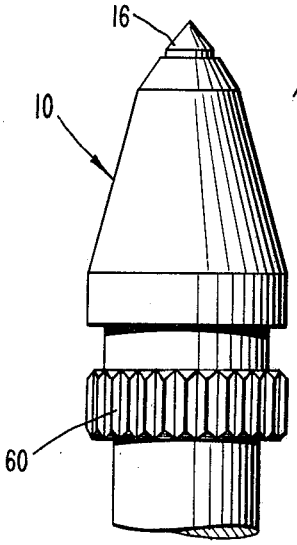
Figure 7:
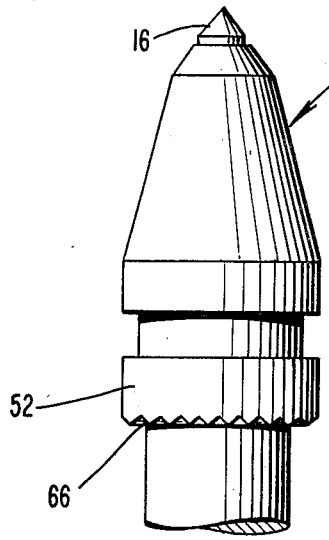
Figure 9:
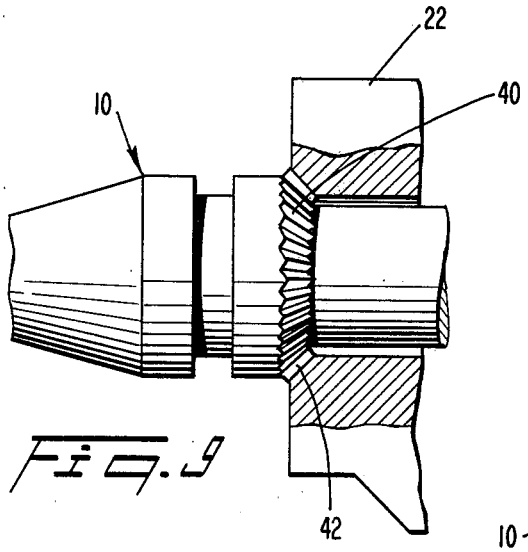
Figure 8:
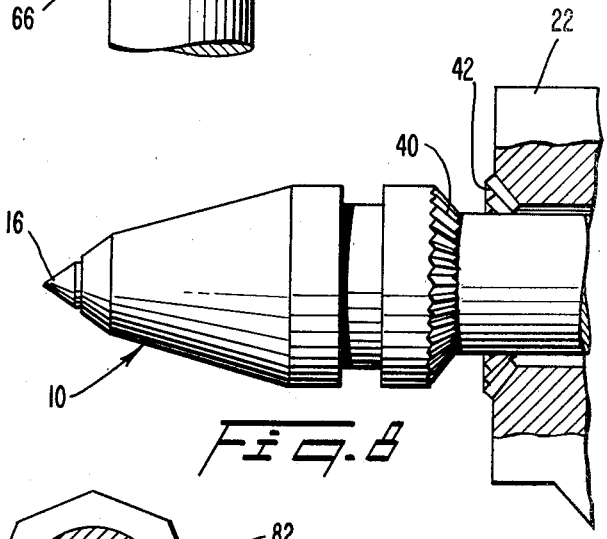
Figure 11:
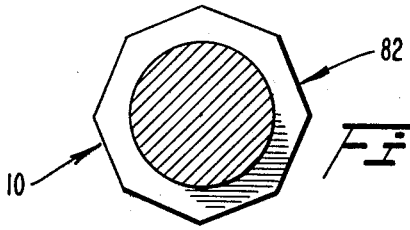
Figure 10:
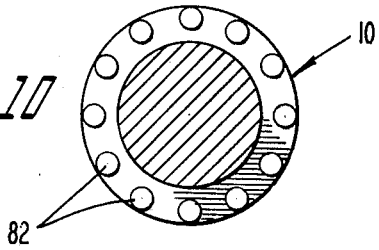
Figure 14:
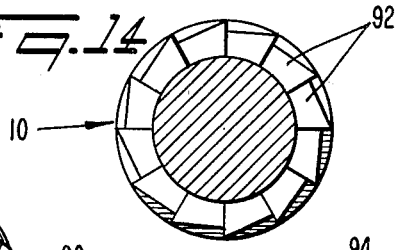
Figure 12:
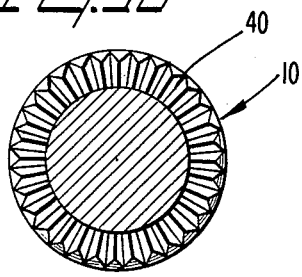
Figure 13:
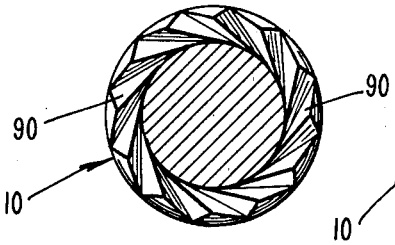
Figure 15:
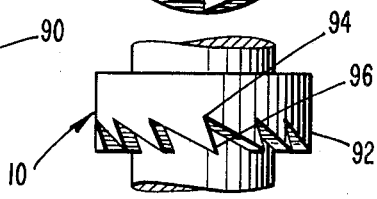
Figure 16:
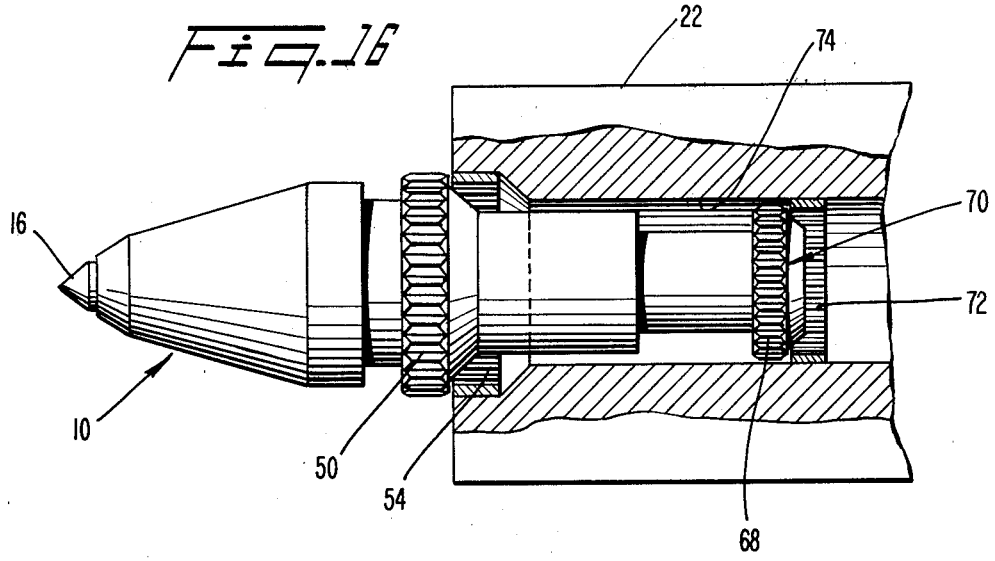
Figure 17:
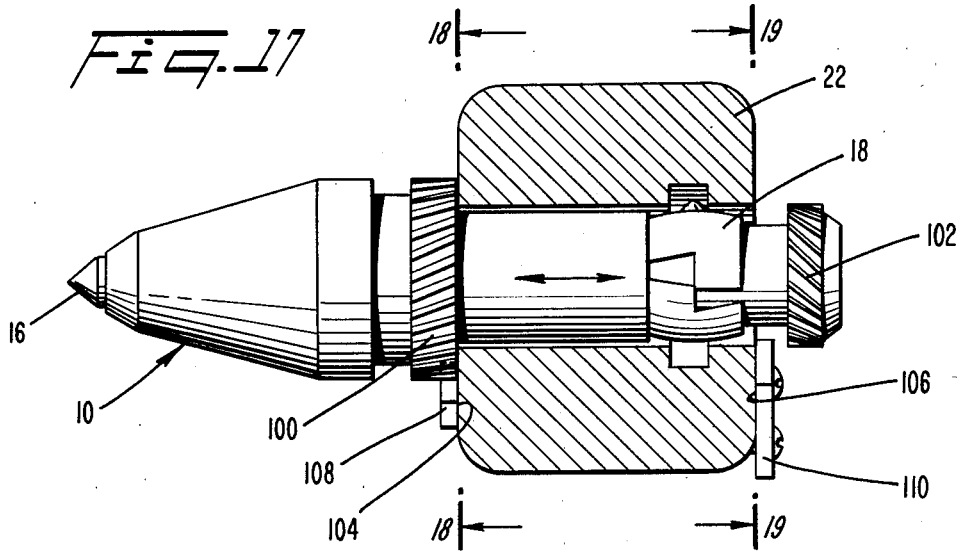
Figure 18:
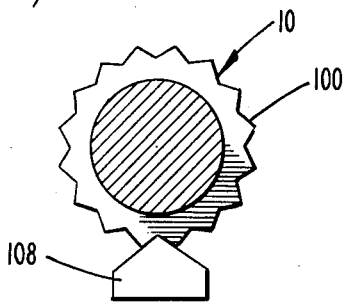
Figure 19:
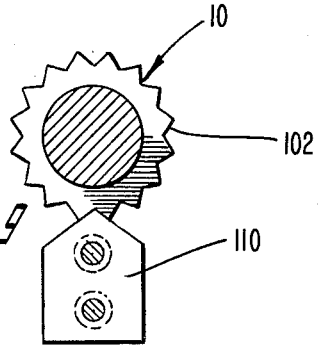

United States Defensive Publication [19] (H) [11] T103,602

Rettkowski [43] Nov. 1, 1983

[54] ROTARY-TYPE CUTTER ELEMENT WITH MEANS FOR DISTRIBUTING WEAR

[76] Inventor: Gary H. Rettkowski, 112 Yeager Rd., Mountaintop, Pa. 18707

[21] Appl. No.: 334,637

[22] Filed: Dec. 28, 1981

[51] Int. Cl.[3] ..... E21C 35/18

[52] U.S. Cl. ..... 299/10; 299/86; 175/354

[57] ABSTRACT

A mining cutter comprises a plurality of holders mounted on a tool support, and a cutting element mounted in a socket of each holder. The tool support is driven such that the cutting elements are alternately moved into cutting and non-cutting modes relative to an earth formation. A retainer rotatably retains each cutting element in its associated socket for limited longitudinal forward movement relative to the holder toward the non-cutting mode and limited longitudinal rearward movement toward the cutting mode. Each cutting element and holder includes mutually engageable surfaces for preventing rotation of the cutting element in the cutting mode while permitting rotation of the cutting element in the non-cutting mode. The arrangement may be such that rotary movement of the cutter element is induced as the cutter element travels toward its cutting mode and/or toward its non-cutting mode.

23 Claims, 3 Sheets Drawing,

23 Pages Specification

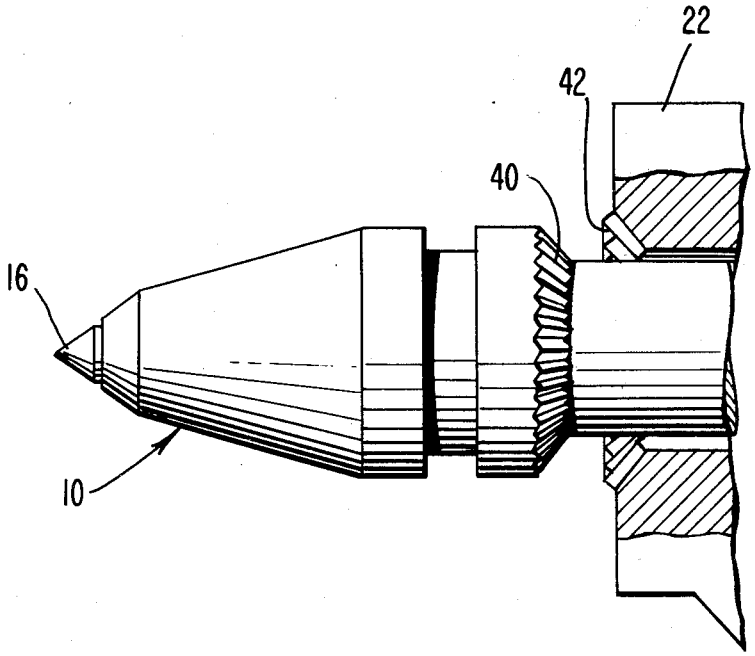

The file of this unexamined application may be inspected and copies thereof may be purchased (849 O.G. 1221, Apr. 9, 1968).